US009396750B2

(12) United States Patent
Chu et al.

(10) Patent No.: US 9,396,750 B2
(45) Date of Patent: Jul. 19, 2016

(54) NEAR-FIELD TRANSDUCER EFFICIENCY MONITORING SYSTEM

(71) Applicant: Seagate Technology LLC, Cupertino, CA (US)

(72) Inventors: Alfredo Chu, Prior Lake, MN (US); Kenneth Arthur Haapala, Plymouth, MN (US); Paul William Burnett, Savage, MN (US); Siew Kin Chow, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/852,755

(22) Filed: Sep. 14, 2015

(65) Prior Publication Data

US 2015/0380040 A1 Dec. 31, 2015

Related U.S. Application Data

(63) Continuation of application No. 14/185,424, filed on Feb. 20, 2014, now Pat. No. 9,142,244.

(51) Int. Cl.
| | | |
|---|---|---|
| *G11B 11/00* | (2006.01) | |
| *G11B 13/08* | (2006.01) | |
| *G11B 7/1267* | (2012.01) | |
| *G11B 7/1263* | (2012.01) | |
| *G11B 5/48* | (2006.01) | |
| *G11B 5/60* | (2006.01) | |
| *G11B 5/31* | (2006.01) | |
| *G11B 5/09* | (2006.01) | |
| *G11B 5/00* | (2006.01) | |

(52) U.S. Cl.
CPC *G11B 13/08* (2013.01); *G11B 5/09* (2013.01); *G11B 5/314* (2013.01); *G11B 5/4866* (2013.01); *G11B 5/6088* (2013.01); *G11B 7/1263* (2013.01); *G11B 7/1267* (2013.01); *G11B 2005/0021* (2013.01)

(58) Field of Classification Search
CPC .................. G11B 5/4866; G11B 2005/0021; G11B 5/314; G11B 5/6088; G11B 2005/001; G11B 7/1387; G11B 5/3116; G11B 5/3133; G11B 5/3136; G11B 13/08; G11B 7/1384
USPC ............................................ 369/13.33, 13.13
See application file for complete search history.

(56) References Cited

U.S. PATENT DOCUMENTS

| | | | |
|---|---|---|---|
| 6,956,710 B2 | 10/2005 | Yun et al. | |
| 6,975,468 B1 | 12/2005 | Melrose et al. | |
| 7,609,469 B2 | 10/2009 | Gage et al. | |
| 7,738,208 B2 | 6/2010 | Kim et al. | |
| 7,852,587 B2 | 12/2010 | Albrecht et al. | |
| 7,907,361 B2 | 3/2011 | Deng et al. | |
| 8,081,542 B1 | 12/2011 | Grobis et al. | |
| 8,085,487 B1 | 12/2011 | Jung et al. | |
| 8,116,020 B1 | 2/2012 | Lee | |
| 8,355,300 B2 | 1/2013 | Grobis et al. | |
| 8,619,508 B1 | 12/2013 | Krichevsky et al. | |
| 8,958,271 B1 | 2/2015 | Peng et al. | |
| 9,042,208 B1 | 5/2015 | Knigge et al. | |
| 9,153,272 B1 * | 10/2015 | Rausch | G11B 7/1267 |

* cited by examiner

*Primary Examiner* — Ali Neyzari
(74) *Attorney, Agent, or Firm* — Hall Estill Attorneys at Law

(57) ABSTRACT

A system may have a data storage medium that contains at least one data bit that is accessed by a transducing head that has a near-field transducer. A controller can be connected to the transducing head and store a plurality of near-field transducer operating currents in a memory. The controller may identify a change in efficiency of the near-field transducer from the plurality of near-field transducer operating currents.

20 Claims, 5 Drawing Sheets

US 9,396,750 B2

NEAR-FIELD TRANSDUCER EFFICIENCY MONITORING SYSTEM

RELATED APPLICATION

The present application is a continuation of copending U.S. patent application Ser. No. 14/185,424 filed Feb. 20, 2014 which issues as U.S. Pat. No. 9,142,244 on Sep. 22, 2015.

SUMMARY

Various embodiments may employ a system with a data storage medium that contains at least one data bit that is accessed by a transducing head having a near-field transducer. A controller can be connected to the transducing head and store a plurality of near-field transducer operating currents in a memory. The controller may identify a change in efficiency of the near-field transducer from the plurality of near-field transducer operating currents.

A system may, in some embodiments, configure a data storage medium to contain at least one data bit before a controller connected to the transducing head directs access of the at least one data bit with a transducing head having a near-field transducer. A plurality of near-field transducer operating currents may be stored in a memory and used to identify a change in efficiency of the near-field transducer.

Various embodiments can configure a data storage medium to contain at least one data bit that is accessed by a transducing head having a near-field transducer as directed by a controller connected to the transducing head. A plurality of near-field transducer operating currents may be stored in a memory and compared to at least two corresponding bit error rates to identify a change in efficiency of the near-field transducer.

DETAILED DESCRIPTION

Advancement in heat assisted magnetic recording (HAMR) technology has allowed increased data storage device performance. As HAMR hardware accommodates increasing data storage capacity and data bit access speeds, operational stresses, like heat and magnetics, can jeopardize the accuracy of data bit writing and consequently the performance of a data storage device. Hence, there is a continued industry and consumer interest in assessing the health of HAMR hardware, identifying lost efficiency, detecting potential failures, and adapting operating conditions to account for measured efficiency changes.

Accordingly, a system may have a data storage medium that contains at least one data bit that is accessed by a transducing head having a near-field transducer. A controller can be connected to the transducing head, store a plurality of near-field transducer operating currents in a memory, and identify a change in efficiency of the near-field transducer from the plurality of near-field transducer operating currents. The ability to monitor the efficiency of a near-field transducer and other HAMR hardware, such as a laser diode, can allow the controller to adapt operating current to minimize the risk of a failure. Knowledge of the status of HAMR hardware can further allow the operating current to be optimized to provide adequate heat to write data without unduly adding heat and energy consumption to the system.

Figure 1:
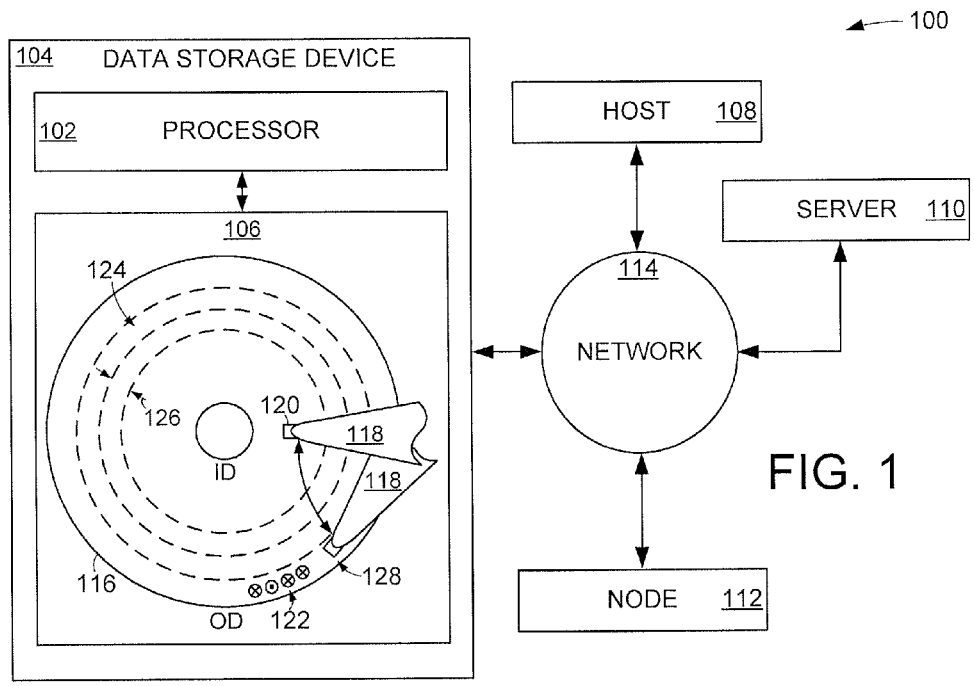
FIG. 1 is a block representation of an example portion of a data storage system configured and operated in accordance with some embodiments.

While HAMR hardware, like a near-field transducer, can be monitored and tested in an unlimited variety of environments and systems, FIG. 1 illustrates a block representation of an example data storage system 100 configured in accordance with various embodiments. The data storage system 100 is configured with a local processor 102 that may be resident in a data storage device 104 to direct data access activities to and from at least one data storage assembly 106, which is partially illustrated as a top view block representation in FIG. 1.

Access to the data storage assembly 106 may further be provided to a plurality of remote hosts 108, servers 110, and nodes 112 via wired and wireless networks 114. Through appropriate network protocol, the network 114 can allow successive and concurrent interaction between the local data storage device 104 and remote features to temporarily and permanently store data to one or more data storage media 116 of the data storage assembly 106. While not required or limiting, the data storage assembly 106 may have at least one actuating assembly 118 that is capable of positioning a transducing head 120 over a variety of locations on the magnetic storage media 116 where stored data bits 122 are located on predetermined data tracks 124.

In an effort to elevate data storage capacity, data bits may be positioned with increased linear density along each data track 124. That is, the data bit areal density of the data storage media 116 may be increased by positioning data bits closer together along the path of each data track 124 and by formatting the media 116 with greater numbers of data tracks 124 having reduced widths 126. Movement of the storage media 116 can be facilitated through attachment to one or more spindle motors that rotate during use to produce an air bearing surface (ABS) on which a slider portion of the actuating assembly 118 flies to position a head gimbal assembly (HGA) 128, which includes the transducing head 120, over a predetermined portion of the media 116.

The transducing head 120 can be configured with one or more transducing elements, such as a magnetic writer and magnetically responsive sensor, which operate to write and read data from the selected data tracks 124 of the storage media 116, respectively. In this way, controlled motion of the actuating assembly 118 corresponds with alignment of the transducers with the data tracks 124 defined on the storage media surfaces to write, read, and rewrite data. As the data bits 122 become more densely positioned in data tracks 124 with smaller radial widths 126, the head 120 has to be able to write data to smaller physical regions on the media 116 with precise timing. The implementation of HAMR hardware into the head 120 may increase the capabilities and performance of the data storage device 104 by reducing the time and energy used to write data to smaller portions of the media 116.

Figure 2:
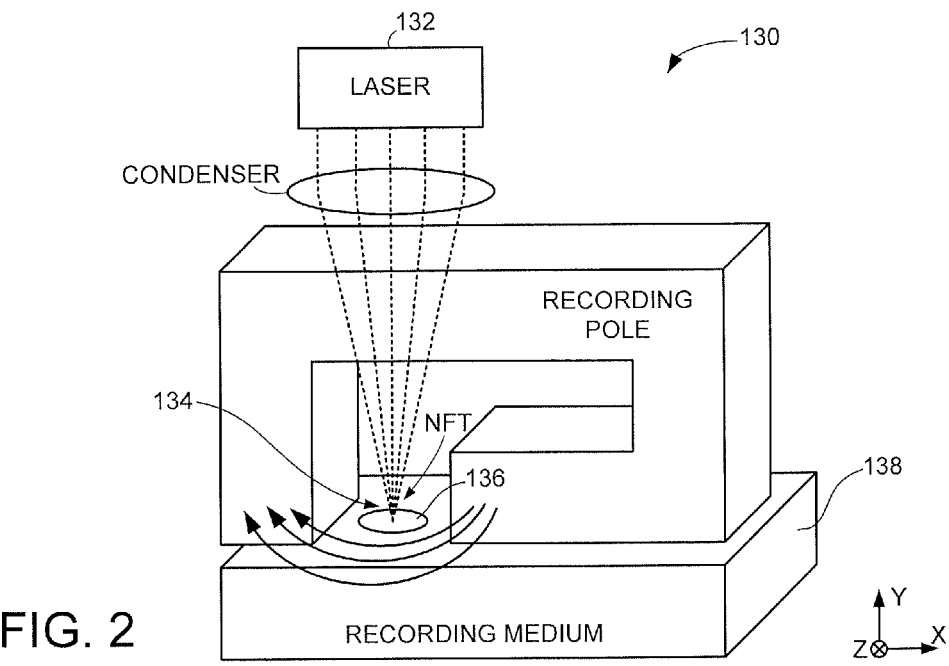
FIG. 2 shows a block representation of a portion of example data storage assembly capable of being utilized in the data storage system of FIG. 1.

FIG. 2 is a block representation of a portion of an example data storage assembly 130 capable of being utilized in a data storage system like system 100 of FIG. 1 in some embodiments. The data storage assembly 130 is configured as an NFT-based HAMR system with a light source (e.g., incident laser) 132, a condenser, and a near-field transducer (NFT) 134. The condenser can represent a first stage while the NFT 134 represents a second stage that cooperate to direct an electromagnetic radiation (e.g., light) beam onto a small spot 136 on a data storage medium 138. It is contemplated that the spot has a predetermined diameter that may be smaller than, greater than, and equal to the size of a data bit, such as about 30 nm.

The NFT 134 can be tuned to transfer optical energy provided by the light source 132 into thermal energy that reduces the magnetic coercivity and anisotropy energy of the medium 138, which allows data to be written faster and with less magnetic strength than if the medium 138 was not heated. However, the high energy and temperature encountered by the NFT 134 can result in inadvertent loss in efficiency and failures. Thus, capabilities of measuring the efficiency of the NFT 134, identifying potential failures, and adapting operating conditions to optimize NFT 134 performance can increase the performance of a data storage device.

Figure 3:
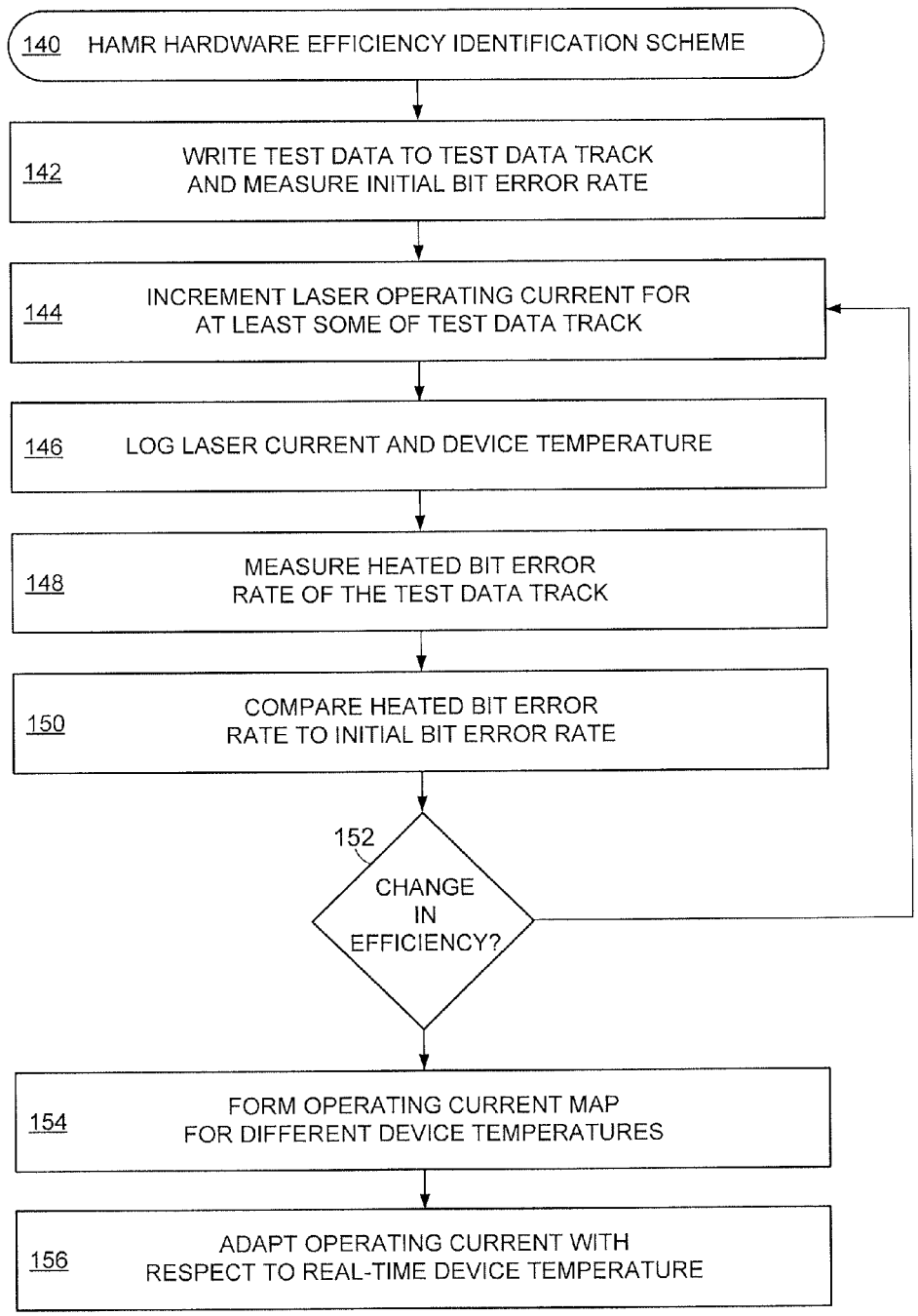
FIG. 3 displays a HAMR hardware efficiency identification scheme in accordance with various embodiments.

FIG. 3 displays an example efficiency identification scheme 140 that may be carried out in accordance with various embodiments to obtain the efficiency of HAMR hardware, such as NFT and laser diode components. The scheme can initially write test data to at least one data track of a data storage medium in step 142 before the initial bit error rate is measured. It should be noted that a bit error rate may be characterized as the number of incorrect data bits per a number of data bits read, which can be restated as the number of incorrect data bits divided by the total number of data bits for a given portion of a data storage medium. The bit error rate may be measured and stored temporarily or permanently to establish the initial data bit writing accuracy of one or more transducing heads and with or without the use of HAMR hardware.

With the test data written, a laser operating current, such as the current sent to the laser diode aspect of the HAMR hardware, can be incremented in step 144 by a predetermined value before the laser is activated for at least some of the test data track. In some embodiments, step 144 activates the HAMR hardware without a data writer portion of the transducing head being active, which may be provided by a register control bit and tuned configuration of a preamp. For example, one or more data writing preamps can be configured to activate a laser diode and NFT without activating a write coil and data writing pole by setting a register control bit and disabling a write enable line to allow a secondary line, such as a PFAST line or PWR_SAVE line, to provide signals to the HAMR hardware.

It is contemplated that step 144 can activate the HAMR hardware by turning on a preamp write enable line. However, such activity can jeopardize the integrity of data storage medium overhead data, such as gray code, stored in servo wedges due to the HARM hardware being active regardless of encountered servo sections. Thus, step 144 can activate the HAMR hardware over user data portions of the data test track with or without the data writer being active while adjusting the laser operating current over servo sections of the data test track to protect the servo data. Various embodiments vary the operating current of the HAMR hardware between high and low, non-zero, values over servo sections of the data test track to prevent inadvertent alteration of the servo data.

The activation of thermal preconditioning via the HAMR hardware over some of the data test track in step 144 advances scheme 140 to step 146 where the laser operating current and data storage device temperature are logged in relation to the activation of the HAMR hardware. That is, step 146 temporarily or permanently stores the conditions in which the HAMR hardware was activated. Such HAMR hardware activation conditions can be correlated with the heated bit error rate measured in step 148 and compared in step 150 to identify if the laser operating current resulted in altered test data bits. Step 150 can compare the heated bit error rate to the initial bit error rate to identify a difference, which corresponds to the activation of the HAMR hardware at the laser operating current in step 144 and a change in efficiency of the HAMR hardware, such as the laser diode and/or NFT.

Decision 152 evaluates if a change in HAMR hardware efficiency is found in the comparison of bit error rates in step 150. The result of decision 152 can correspond with an unlimited variety of results, such as prompting a host a change in efficiency has occurred, halting data writing operations, and adapting data writing current. However, various embodiments use the laser operating current and device temperature logged in step 146 to form an operating current map that illustrates how different operating temperatures and HAMR operating currents affect stored data bits. In other words, step 154 can generate a real-time profile of the risk a laser operating current will alter data bits for a given device temperature, which can be used to proactively optimize the operating current for the writing of non-test data to user data sections of the data storage device in step 156.

Regardless of the occurrence of a change in HAMR hardware efficiency in decision 152, a plurality of similar or dissimilar laser operating currents can be activated for common or different device operating temperatures to generate a more robust operating current map in step 154. In some embodiments, a sweep of incrementally increasing laser operating currents are activated for the test track before heated bit error rates are measured, compared, and mapped in steps 148, 150, and 154, respectively. Other embodiments sporadically utilize different laser operating currents for different encountered device temperatures to fulfill a range of mapped operating currents.

Through the formation and updating of the operating current map in step 154 for various operating conditions, such as device temperature and operating current, step 156 can more precisely adapt the laser operating current to ensure adequate thermal preconditioning is conducted on user data without undue excess power and heat being generated. That is, step 156 can utilize the data from the operating current map to change the laser operating current used to thermally precondition user data for a given device temperature so that the thermal preconditioning has a high chance of altering the magnetic coercivity and written polarity of user data bits to efficiently allow the subsequent writing of user data with a magnetic write pole without using excess energy and generating surplus heat, which can be detrimental to some data storage environments, such as mobile computing environments.

Figure 4:
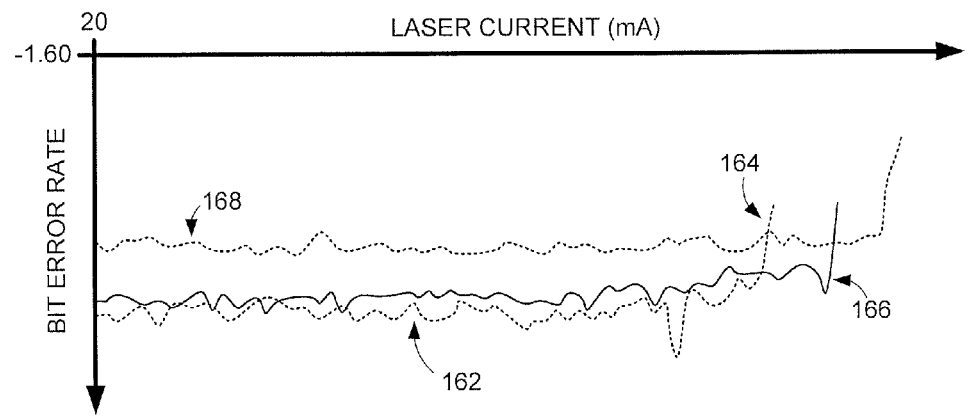
FIG. 4 shows various operational and structural characteristics of example data sensors configured in accordance with some embodiments.

FIG. 4 plots an example operational current map that may be generated by step 156 of FIG. 4 in accordance with various embodiments. Segmented line 162 corresponds with tested bit error rates for various laser currents for a roughly 0° C. device temperature. The variance of the bit error rate for line 162 can be expected based on a variety of operational factors, such as vibration and heat induced protrusion, but the sharp escalation in bit error rate in region 164 indicates the laser current has begun to alter the test data written on the test data track. The identification of region 164 for various device operating temperatures can allow a controller to retroactively and proactively adapt the laser operating current to ensure thermal preconditioning alters the magnetic coercivity of the data storage medium, which corresponds with decreased magnetic writing power and writing time that results in heightened device performance.

Solid line 166 illustrates various measured bit error rates over a range of laser operating current for a device operating at roughly 25° C. Although not identical to segmented line 162, the sharp bit error rate increase at elevated laser operating current similarly indicates the operating current where data bits are altered by the thermal preconditioning. While the bit error rates for various laser operating currents can be mapped and analyzed for an unlimited variety of device operating temperatures, assorted embodiments map bit error rates and operating currents for device temperatures at roughly 0° C., as shown by line 162, 25° C., as shown by line 166, and 50° C., as shown by segmented line 168.

The bit error rates for line 168 indicate how operating temperature for a device can change the average bit error rate and laser operating current corresponding to alteration of prewritten test data. The mapped operational data of FIG. 4 can be utilized to identify past trends, predict future bit error rates, and detect changes in HAMR hardware efficiency. For example, if the bit error rate and laser operating current changes beyond a particular threshold for a given device temperature, comparison of the newly measured bit error rate to the existing data of FIG. 4 can efficiently identify a change in laser diode and/or NFT efficiency.

The ability to continually, sporadically, routinely, and randomly conduct HAMR hardware testing to identify changes in efficiency can be burdensome on some data storage systems. For example, a writing preamp that cannot selectively activate HAMR hardware without a corresponding magnetic data writer may expend unnecessary power and timing resources to map bit error rates for various device temperatures and laser operating currents. Hence, the tuned configuration of a writing preamp to allow individual activation of HAMR hardware without a corresponding data writer can increase HAMR hardware efficiency testing efficiency, which can correspond with little to no loss in device performance despite increased amounts of laser and NFT operation.

Figure 5:
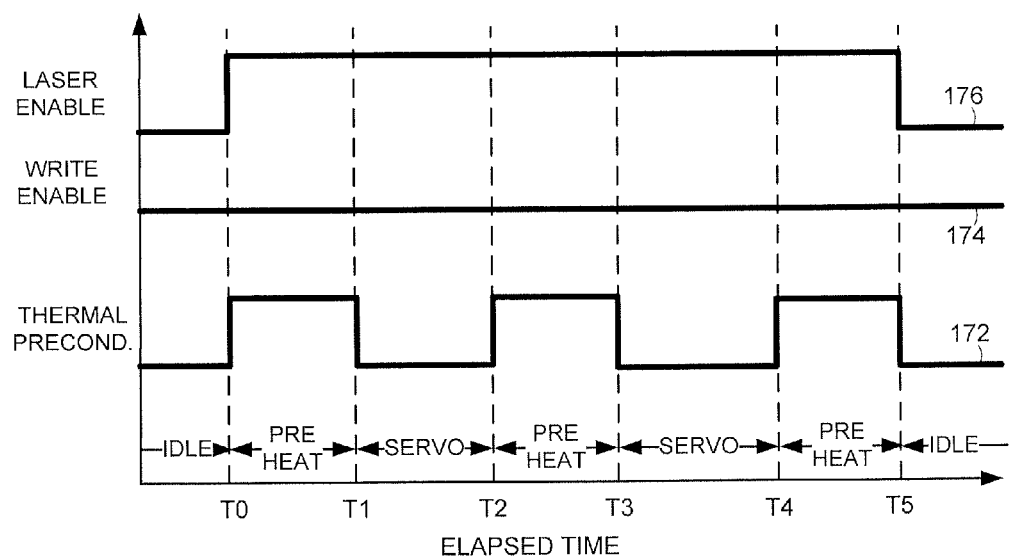
FIG. 5 is a timing diagram for an example data sensor operated in accordance with various embodiments.

FIG. 5 displays a graphical representation of timing information relating to the operation of an example data storage system employing a tuned writing preamp. The thermal preconditioning timing data 172 represents the activation of at least a laser diode and NFT for a predetermined operating current. It can be appreciated that the laser operating current can be elevated from a low current value to an elevated value at time T0 until time T1 to preheat a non-servo section of a data storage medium to temporarily reduce the magnetic coercivity of the non-servo section. The preheating of the non-servo section can be discontinued at time T1 as servo sections of the data storage medium are encountered.

The cyclical preheating of various non-servo sections of the data storage medium can provide laser exposure to some, or all, of a data track, which can provide more robust bit error rate differences than if a single section of a data track is exposed. As discussed above, the enabling of magnetic writing during thermal preconditioning can unnecessarily use system power and processing overhead. Therefore, a tuned data writing preamp can be configured to maintain a deactivated write enable line during the thermal preconditioning, as shown by line 174. Various embodiments provide a secondary laser enable signal 176 that can be activated individually, irrespective of the write enable status 174.

As a non-limiting example, the timing of lines 172, 174, and 176 can be employed to sweep the laser operating current from a predetermined low level, such as a non-zero value, to a predetermined high level in accordance with a routine stored locally or remotely. Such a sweep of laser operating current may execute a number of magnetic data writes with, or without, a data writer being activated before a bit error rate for the written data track is measured and analyzed to identify any changes in HAMR hardware efficiency. It is noted that the writing of data may correspond with increased processing complexity as the write enable line 176 activates the magnetic data writer to emit magnetic flux and write predetermined magnetic polarities as data bits.

Another non-limiting embodiment that utilizes a tuned writer preamp simplifies device firmware and test code implementations by conducting timing operations as illustrated in FIG. 5. That is, test data written to a test data track can be exposed to HAMR thermal preconditioning without the magnetic data writer being active by setting a register control bit to activate the laser enable line 176 in a writing preamp while the write enable line 174 is maintained deactivated. As such, the thermal preconditioning can be active for user data regions of the test data track without using power and generating heat by maintaining the magnetic data writer in an active state.

Figure 6:
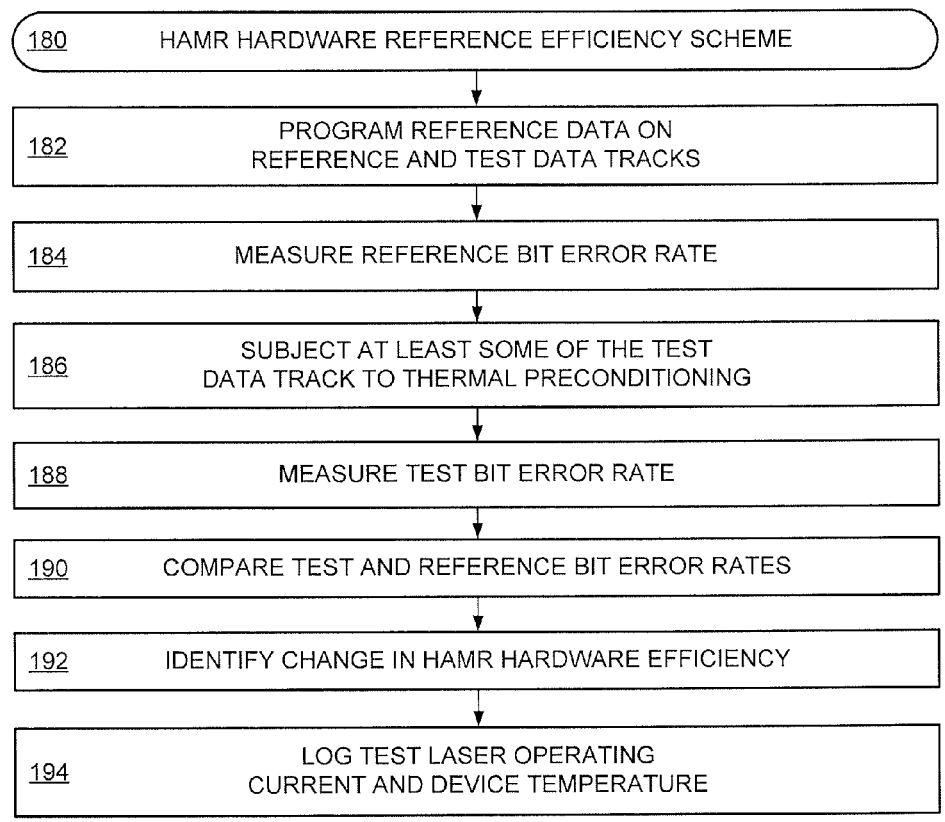
FIG. 6 provides an example HAMR hardware reference efficiency scheme that may be conducted in accordance with some embodiments.

It should be noted that the preamp activation of HAMR hardware while the corresponding magnetic data writer is deactivated at the preamp does not preclude any diverse data, data track, laser diode, and NFT testing that may be conducted. For example, the HAMR hardware efficiency identification scheme 140 of FIG. 3 can be conducted with or without a magnetic data writer being active. FIG. 6 is a flowchart of an example HAMR hardware reference efficiency scheme 180 that may be carried out with or without a magnetic data writer being active. The scheme 180 is not limiting or required, as shown, but may begin with step 182 writing a pattern of reference data on reference and test data tracks. The reference and test data tracks can be positioned and configured in an unlimited variety of manners, such as in user available data space, reserved data space, hidden data space, adjacent data tracks, and different data memories.

Step 184 proceeds to establish a reference bit error rate by measuring the bit error rate of at least one of the reference and test data tracks. The reference bit error rate can be static or dynamic as various subsequent bit error rate measurements can be conducted to update the reference bit error rate. Next, at least some of the test data track can be subjected to thermal preconditioning via one or more HAMR hardware operations in step 186. For instance, data storage medium heating can be conducted in step 186 with a single activation of a laser or with a plurality of laser activations over the course of multiple medium revolutions. The thermal preconditioning of step 186 may be conducted in accordance to a controller that directs laser activation in response to a predetermined condition being satisfied, such as a device temperature being reached, a low system processing time, and during the writing of user data to proximal user data tracks.

With the test data track being exposed to thermal preconditioning, step 188 can measure a test bit error rate and compare that test bit error rate to the reference bit error rate in step 190 to determine if a predetermined change in bit error rate, such as 25% change, is experienced for the laser operating current and device temperature present during step 186. The comparison of test and reference bit error rates in step 190 can provide a more accurate identification of HAMR hardware efficiency change in step 192 by eliminating some common operational variances, like transducing head clearance, that can contribute to bit error rate without originating from HAMR hardware operation.

The identification of a change in HAMR hardware efficiency in step 192 can concurrently or successively induce step 194 to log the test laser operating current and device temperature to allow an operating current map to be generated. The logging of operating current and device temperature in step 194 further allows changes in HAMR hardware efficiency to be stored, read, and sent to a variety of different hosts, such as a local controller, local host, remote node, and remote server. The various steps of scheme 180 are not required or limiting as changes, omissions, and additions can be conducted, at will. For example, an additional step may be interjected after step 186 that waits a predetermined number of data storage medium revolutions, such as two revolutions, before step 188 measures the test bit error rate.

Figure 7:
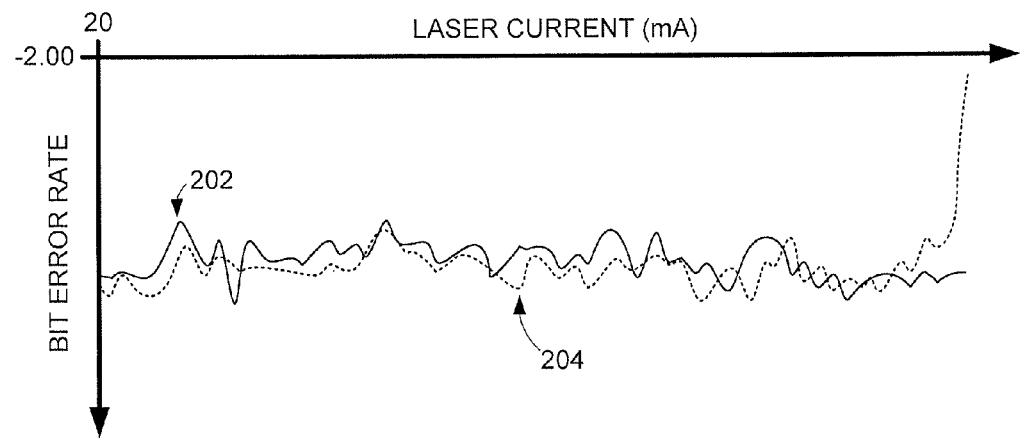
FIG. 7 plots various operational and structural characteristics for example data sensors tuned in accordance with various embodiments.

FIG. 7 provides a visual representation of example operational data that may be accumulated and compiled in accordance with scheme 180 of FIG. 6. Solid line 202 represents a variety of logged reference bit error rates for a range of laser operating currents for a given device temperature. Meanwhile, segmented line 204 represents example test bit error rates for the same range of laser operating currents for the given device temperature. It can be appreciated that the reference bit error rate 202 is quite stable and the differences between lines 202 and 204 can instill confidence that any measured bit error rate change can be attributed solely to the operating current and device temperature combination HAMR hardware condition subjected to the test data track in step 186.

It is contemplated that reference bit error rates can be compiled for a variety of different device operating temperatures, which may be appear similar to the operating current map of FIG. 5. The continuous or sporadic evaluation of HAMR hardware efficiency, both via scheme 140 or 180, can identify the health of HAMR hardware and allow for proactive and retroactive adaptations to be carried out by a local controller to optimize thermal preconditioning operations in a data storage device. The identification of changes in HAMR hardware efficiency may further be parsed to determine the efficiency of specific hardware components, such as laser diode and NFT components. That is, bit error rate trends, which may be in relation to a reference bit error rate, can deduce a loss in efficiency in a laser diode, NFT, or both.

Figure 8:
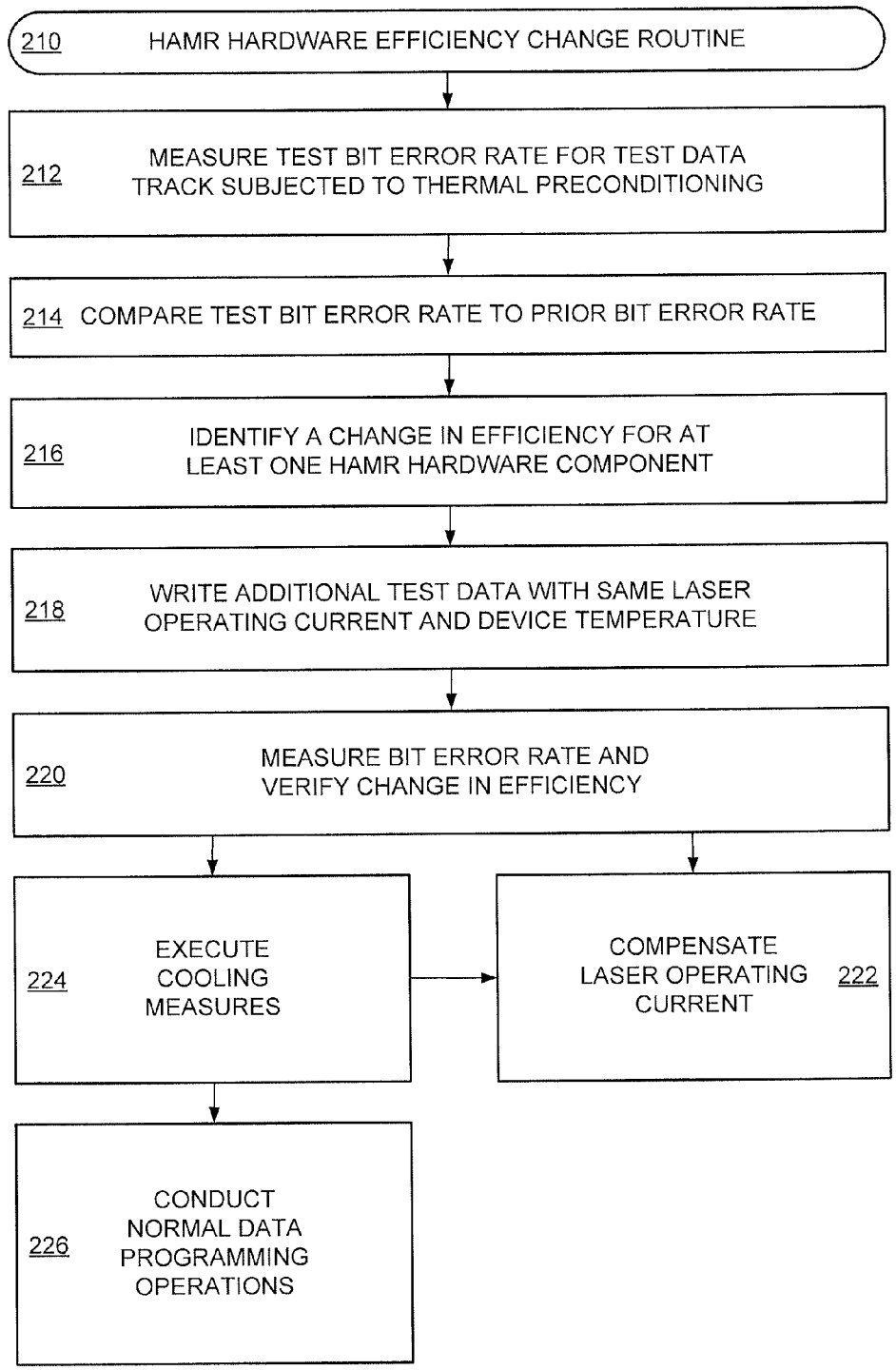
FIG. 8 shows an example HAMR hardware efficiency change routine that may be carried out in accordance with various embodiments.

FIG. 8 illustrates an example HAMR hardware efficiency change routine 210 that can be carried out in accordance with various embodiments to optimize data storage performance in view of changes in HAMR hardware efficiency. Initially, step 212 can measure the bit error rate for a test data track subjected to thermal preconditioning. Step 214 compares the measured bit error rate to allow step 216 to identify a change in efficiency in a laser diode, NFT, or data storage medium. The change in efficiency can then be verified by writing additional test data to the test data track with a laser operating current and device temperature that matches the conditions used in step 212.

A subsequent bit error rate measurement in step 220 of the test data track modified in step 218 verifies that the thermal preconditioning correctly or incorrectly altered the test data bits to allow for efficient and accurate heat assisted magnetic recording. In the event step 220 determines that a detrimental change in HAMR hardware efficiency has occurred, a data storage device controller can carry out an unlimited variety of adaptation measures actively and passively. In the non-limiting embodiment shown in FIG. 8, a controller can adapt thermal preconditioning operations for changes in HAMR hardware efficiency by compensating laser operating current for at least one device operating temperature, as shown in step 222. Such compensation may increase or decrease laser operating current and/or alter thermal preconditioning timing so that greater or lesser amounts of time are spent heating data bits.

While compensating for changes in HAMR hardware efficiency may be conducted at any time, various embodiments execute cooling measures in step 224 to bring the device operating temperature down. A particular cooling measure is not required, but may be at least lowering data storage medium rotating speed, suspending thermal preconditioning, suspending data writing operations, docking one or more transducing heads, and exclusively conducting data read operations for a predetermined amount of time. The ability to use one or more cooling measures in step 224 individually and collectively can change the operating temperature of a device and minimize the effect of an identified HAMR hardware loss in efficiency.

It is contemplated that cooling measures conducted in step 224 may or may not provide optimized data storage conditions with respect to a degraded HAMR component. Hence, step 224 may proceed to step 222 to further adjust HAMR hardware operating current or to step 226 where normal data storage operations are conducted at a lower device temperature without changes to laser operating current. The ability to adapt data storage device operating conditions to accommodate a change in HAMR hardware efficiency allows for long-term optimized data storage regardless of encountered losses in laser diode, NFT, and data storage medium efficiency.

Through the identification of a change in efficiency of one or more HAMR hardware components, the real-time health of a data storage device can be ascertained. A change in HAMR hardware efficiency can be predicted, recognized, and adapted to ensure minimal loss in data storage performance. Additionally, the health of HAMR hardware can allow for the optimization of laser operating currents to provide sufficient heating of an adjacent data storage medium without unduly consuming system power and generating heat, which can be particularly important in mobile data storage device environments where power consumption and thermal management are paramount to user enjoyment.

While the embodiments herein have been directed to HAMR data writing, it will be appreciated that the claimed invention can readily be utilized in any number of other applications, including solid-state data storage device applications. It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:
1. A method comprising:
connecting a controller to a transducing head having a laser and a near-field transducer;
storing a plurality of laser operating currents with the controller;

decreasing an initial laser operating current to a first adjusted laser operating current in response to a measured bit error rate being lower than a maximum bit error rate;

selecting a second adjusted laser operating current from the plurality of laser operating currents in response to a detected device operating temperature, the second adjusted laser operating current being lower than the first adjusted laser operating current; and accessing a data bit stored on a data storage medium with the second adjusted laser operating current.

2. The method of claim 1, wherein the controller stores a drive temperature in a local memory for each of the plurality of laser operating currents.

3. The method of claim 1, wherein the data storage medium comprises a reference data track with at least one reference data bit, the controller identifies the measured maximum bit error rate as a comparison between a first bit error rate of the reference data track and a second bit error rate of a user data track.

4. The method of claim 1, wherein the controller selects the second adjusted laser operating current in to reduce the detected device operating temperature.

5. The method of claim 1, wherein the second adjusted laser operating current is sufficient to raise the data storage medium above a Curie temperature for at least one constituent layer.

6. The method of claim 1, wherein the controller forms an operating current map that correlates the plurality of laser operating currents with data storage device temperatures.

7. The method of claim 1, wherein the controller suspends operation of the laser and near-field transducer in response to passing over a servo section of the data storage medium.

8. The method of claim 1, wherein the controller directs scheduled tests of different laser operating currents prior to user data being stored on the data storage medium and after user data is stored on the data storage medium.

9. The method of claim 1, wherein the controller selects the second adjusted laser operating current in response to a change in a real-time bit error rate.

10. An apparatus comprising a controller connected to a transducing head having a laser and a near-field transducer, the controller configured to store a plurality of laser operating currents and access a data bit stored on a data storage medium subsequent to an initial laser operating current decreasing to a first adjusted laser operating current then to a second adjusted laser operating current, the first and second laser operating currents each being selected from the plurality of laser operating currents, the first adjusted laser operating current corresponding with a measured bit error rate being lower than a maximum bit error rate, the second adjusted laser operating current selected in response to a detected device operating temperature.

11. The apparatus of claim 10, wherein the laser is positioned to interact with the near-field transducer.

12. The apparatus of claim 10, wherein the data storage medium comprises a plurality of layers to magnetically store a plurality of data bits.

13. The apparatus of claim 10, wherein the transducing head, data storage medium, and controller comprise a heat assisted magnetic recording system.

14. The apparatus of claim 10, wherein a laser preamp is connected to the controller and provides the plurality of laser operating currents.

15. A method comprising:
connecting a controller to a transducing head having a laser and a near-field transducer;

storing a plurality of laser operating currents with the controller;

comparing an initial laser operating current to a first adjusted laser operating current based on a measured bit error rate;

decreasing the initial laser operating current to the first adjusted laser operating current in response to the measured bit error rate being lower than a maximum bit error rate;

selecting a second laser operating current in response to a detected device operating temperature, the second adjusted laser operating current being lower than the first laser operating current; and accessing a data bit stored on a data storage medium with the second adjusted laser operating current.

16. The method of claim 15, wherein the plurality of laser operating currents comprises a range of different laser current values.

17. The method of claim 16, wherein a bit error rate is measured and stored by the controller for each different laser current value.

18. The method of claim 15, wherein at least one laser operating current is applied with a write enable preamp disabled.

19. The method of claim 15, wherein a register control bit is set by the controller to enable detection of the first and second detected bit error rates without writing data to the data bit.

20. The method of claim 15, wherein the controller identifies a minimum laser operating current that alters the data bit.

* * * * *